US008607005B2

United States Patent
Boyd et al.

(10) Patent No.: US 8,607,005 B2
(45) Date of Patent: Dec. 10, 2013

(54) MONITORING PROGRAM EXECUTION TO LEARN DATA BLOCKS ACCESSED BY SOFTWARE PROCESS FOR FACILITATING EFFICIENT PREFETCHING

(75) Inventors: Kenneth Wayne Boyd, Tucson, AZ (US); Kenneth Fairclough Day, III, Tucson, AZ (US); David Allan Pease, Redwood Estates, CA (US); John Jay Wolfgang, Winston-Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 1336 days.

(21) Appl. No.: 11/357,473

(22) Filed: Feb. 17, 2006

(65) Prior Publication Data
US 2007/0198780 A1    Aug. 23, 2007

(51) Int. Cl.
G06F 12/00    (2006.01)
G06F 13/00    (2006.01)
G06F 13/28    (2006.01)

(52) U.S. Cl.
USPC ........... 711/154; 711/158; 711/165; 711/100; 711/137; 711/213; 711/204

(58) Field of Classification Search
None
See application file for complete search history.

(56) References Cited

U.S. PATENT DOCUMENTS

| 4,829,425 | A | | 5/1989 | Bain, Jr. et al. | 364/200 |
| 5,829,028 | A | * | 10/1998 | Lynch et al. | 711/126 |
| 6,055,650 | A | * | 4/2000 | Christie | 714/39 |
| 6,134,643 | A | * | 10/2000 | Kedem et al. | 711/213 |
| 6,678,795 | B1 | * | 1/2004 | Moreno et al. | 711/137 |
| 6,687,794 | B2 | | 2/2004 | Malik | 711/137 |
| 6,760,818 | B2 | * | 7/2004 | van de Waerdt | 711/137 |
| 6,820,133 | B1 | | 11/2004 | Grove et al. | 709/238 |
| 2005/0071601 | A1 | | 3/2005 | Luick | 711/206 |
| 2005/0204095 | A1 | * | 9/2005 | Dayan et al. | 711/112 |
| 2010/0199043 | A1 | * | 8/2010 | Sechrest et al. | 711/118 |

\* cited by examiner

Primary Examiner — Tuan Thai
Assistant Examiner — Marwan Ayash
(74) Attorney, Agent, or Firm — Kunzler Law Group (57) ABSTRACT

An apparatus, system, and method are disclosed for determining prefetch data. A start module communicates a start of a target software process to a storage device. A learning module learns data blocks accessed for the target software process. In one embodiment, a prefetch module prefetches the learned data blocks in response to the start of the target software process. An end module communicates the end of the target software process to the storage device. In one embodiment, the prefetch module terminates prefetching data blocks and the learning module terminates learning the data blocks accessed for the target software process in response to the end module's communication of the end of the target software process.

12 Claims, 8 Drawing Sheets

| Target Software Process Identifier 815 | | Target Software Process Execution Count 845 | | |
|---|---|---|---|---|
| First Data Block Identifier 820a | First Previous Count 825a | First Current Count 830a | First Previous Sequence 835a | First Current Sequence 840a |
| Second Data Block Identifier 820b | Second Previous Count 825b | Second Current Count 830b | Second Prev Sequence 835b | Second Current Sequence 840b |
| Third Data Block Identifier 820c | Third Previous Count 825c | Third Current Count 830c | Third Previous Sequence 835c | Third Current Sequence 840c |

805 → header row
810a, 810b, 810c → data rows

FIG. 8

MONITORING PROGRAM EXECUTION TO LEARN DATA BLOCKS ACCESSED BY SOFTWARE PROCESS FOR FACILITATING EFFICIENT PREFETCHING

BACKGROUND OF THE INVENTION

1. Field of the Invention

This invention relates to prefetching data and more particularly relates to determining prefetch data in a storage device.

2. Description of the Related Art

A computer such as a computer workstation, server, or mainframe computer often stores data in a storage device. The storage device may store the data on one or more storage media including hard disk drives, optical storage drives, micromechanical storage devices, magnetic tape drives, or semiconductor storage devices. In one embodiment, the storage device is configured as a storage controller that controls a plurality of hard disk drives.

The computer may read data from the storage device by requesting the data from the storage device. In response to the request, the storage device retrieves the data from the storage media and communicates the data to the computer. Unfortunately, there is typically a significant delay between when the storage device receives the request and when the storage device is able to communicate the data. The computer may also write data to the storage device by communicating the data to the storage device. The storage device receives the communicated data and writes the data to the storage media.

Storage devices often include a buffer to reduce the time required to write data to and read data from the storage device. The buffer is typically able to receive and communicate data more rapidly than the storage media, reducing the time required to perform reads and writes. For example, the computer may rapidly write data to the buffer of the storage device. The storage device then copies the data from the buffer to the storage media while the computer proceeds to another task.

The buffer may also reduce the time required for reads. For example, the storage device may retrieve data in advance of a read or prefetch the data to the buffer. Thus when the storage device receives a request for the data, the data may be communicated rapidly from the buffer. Unfortunately, the storage device is unable to determine which data should be prefetched to the buffer without direction. A software process executing on the computer may be configured to direct the storage device to prefetch data, but many software processes do not include prefetch capabilities.

From the foregoing discussion, it should be apparent that a need exists for an apparatus, system, and method that determine prefetch data for a storage device. Beneficially, such an apparatus, system, and method would allow the storage device to prefetch data to speed data reads.

SUMMARY OF THE INVENTION

The present invention has been developed in response to the present state of the art, and in particular, in response to the problems and needs in the art that have not yet been fully solved by currently available prefetch methods. Accordingly, the present invention has been developed to provide an apparatus, system, and method for determining prefetch data that overcome many or all of the above-discussed shortcomings in the art.

The apparatus to determine prefetch data is provided with a plurality of modules configured to functionally execute the necessary steps of communicating a start of a target software process, learning data blocks for the target software process, and communicating an end of the target software process. These modules in the described embodiments include a start module, a learning module, and an end module.

The start module communicates a start of a target software process to a storage device. In one embodiment, the start module may be configured as an application program interface ("API") that may send a command to the storage device. The command may be a small computer system interface ("SCSI") command, a Fibre Channel Protocol ("FCP") command, or the like. The start module may communicate a target software process identifier such as the name of the target software process. In addition, the start module may communicate one or more data fields configured to indicate to the storage device that the target software process is starting.

The learning module learns data blocks accessed by the target software process. In one embodiment, the learning module maintains a prefetch list of each data block accessed by the target software process. The learning module may also record the frequency and sequence of access for each data block. In a certain embodiment, the learning module begins learning the data blocks upon receiving the communication from the start module.

The end module communicates an end of the target software process to the storage device. In one embodiment, the end module is also configured as an API that communicates a command to the storage device, such as a SCSI command or a FCP command. The end module may communicate the target software process identifier and one or more data fields configured to indicate that the target software process is ending. In one embodiment, the learning module terminates learning the data blocks accessed by the target software process upon receiving the communication from the end module.

In one embodiment, the apparatus further comprises a prefetch module. The prefetch module may prefetch the learned data blocks in response to receiving the communication from the start module. In one embodiment, the prefetch module prefetches data blocks as directed by the prefetch list maintained by the learning module. The apparatus allows the storage device to determine which data blocks should be prefetched for the target software process. In addition, the apparatus may prefetch the learned data blocks.

A system of the present invention is also presented to determine prefetch data. The system may be embodied in a data processing system. In particular, the system, in one embodiment, includes a computer and a storage device. The computer may comprise a start module and an end module. In addition, the storage device may include a buffer, a storage media, and a learning module.

The storage device stores and retrieves data for the computer. The storage device may communicate with the computer over a data bus or through a network connection. Communications through the network connection may be routed through one or more intermediate devices such as communication modules.

The storage device stores the data on the storage media. The storage media may be one or more hard disk drives. The buffer temporarily stores data that is to be written to the storage media, and data that is read from the storage media. In addition, the buffer may store prefetch data in anticipation of the computer requesting the prefetch data.

The start module communicates a start of a target software process to the storage device. The learning module learns data blocks accessed by the target software process. The end module communicates an end of the target software process to the storage device. The system determines prefetch data for the target software process by identifying the target software process and learning the data accessed by the target software process.

A method of the present invention is also presented for determining prefetch data. The method in the disclosed embodiments substantially includes the steps necessary to carry out the functions presented above with respect to the operation of the described apparatus and system. In one embodiment, the method includes communicating a start of a target software process, learning data blocks for the target software process, and communicating an end of the target software process. The method also may include prefetching the learned data blocks.

A start module communicates a start of a target software process to a storage device. In one embodiment, a prefetch module prefetches learned data blocks in response to the start of the target software process. A learning module learns the data blocks accessed by the target software process. An end module communicates an end of the target software process to the storage device. In one embodiment, the prefetch module terminates prefetching data blocks and the learning module terminates learning the data blocks accessed for the target software process in response to the end module's communication of the end of the target software process. The method determines prefetch data for the target software process. In addition, the method may prefetch the learned data blocks for the target software process.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional featured and advantages may be recognized in certain embodiments that may not be present in all embodiments of the invention.

The embodiment of the present invention supports a storage device learning prefetch data for a software process. In addition, the embodiment of the present invention may prefetch data for a software process. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
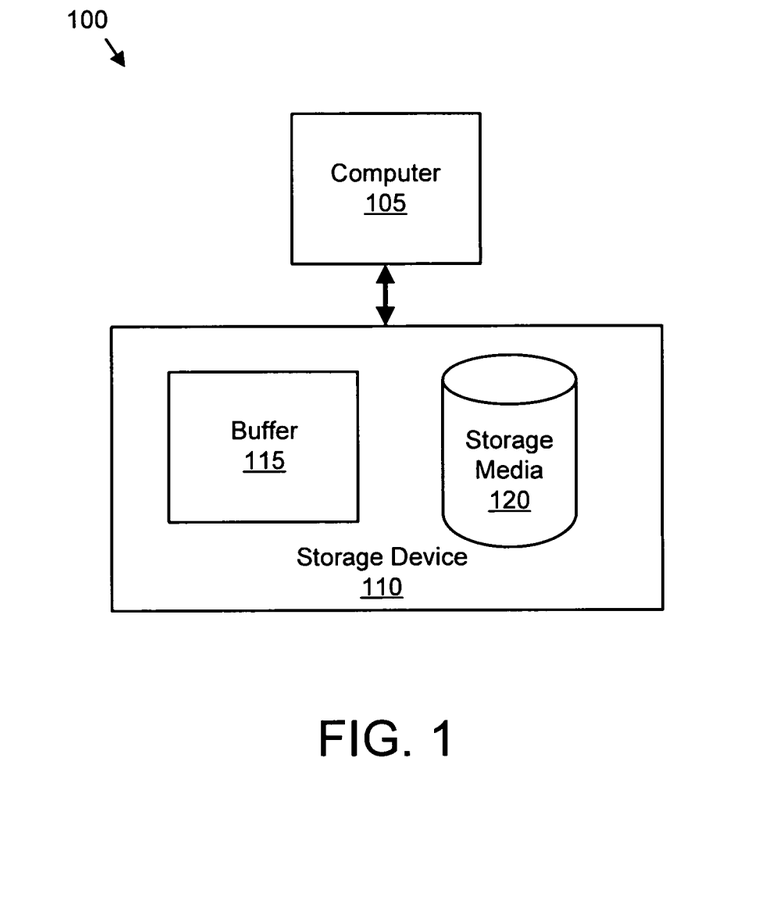
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes a computer 105 and a storage device 110. The computer 105 may be a computer workstation, a server, a mainframe computer, a personal digital assistant, a cellular telephone, or the like. The storage device 110 may be a disk drive, a storage controller, or the like.

In one embodiment, the storage device 110 is a distinct device from the computer 105. For example, the storage device 110 may occupy a separate chassis and communicate with the computer 105 through an external communication channel. In an alternate embodiment, the storage device 110 may be integrated with the computer 105. For example, the storage device 110 may be a micromechanical storage device integrated in the computer 105 chassis.

The storage device 110 stores and retrieves data for the computer 105. The computer 105 executes one or more software processes as is well known to those skilled in the art. The software processes may include an operating system, one or more application programs, and one or more drivers. A software process may direct the computer 105 to write data to and read data from the storage device 110. The storage device 110 may communicate with the computer 105 over an internal data bus or through a communication channel such as a network connection. Communications through the network connection may be routed through one or more intermediate devices.

The storage device 110 stores the data on a storage media 120. The storage media 120 may be a hard disk drive, an optical storage device, a micromechanical storage device, a semiconductor storage device, or the like. A buffer 115 may temporarily store the data that is written to the storage media, and the data that is read from the storage media.

The buffer 115 may be configured as an array of semiconductor memory such as static random access memory ("SRAM") or dynamic random access memory ("DRAM"). For example, the computer 105 may communicate data to the storage device 110 for storage. The buffer 115 may receive the data and the storage device 110 may communicate to the computer 105 that the data was received. The storage device 110 may then write the data from the buffer 115 to the storage media 120. In an alternate example, the computer 105 may request data from the storage device 110. The storage device 110 may retrieve the requested data from the storage media 120 and write the data to the buffer 115. The storage device 110 may subsequently communicate the data from the buffer 115 to the computer 105.

In one embodiment, the computer 105 may direct the storage device 110 to prefetch data from the storage media 120. In response, the storage device 110 may retrieve the prefetch data from the storage media 120 and write the prefetch data to the buffer 115. The storage device 110 does not communicate the prefetch data from the buffer 115 to the computer 105 unless the computer 105 requests the data such as by requesting or reading the data from the storage device 110.

The time required for a device such as the storage device to respond to a request such as a read or a write is often referred to as latency. The latency for data retrieved from the storage media 120 is typically much longer than the latency for data retrieved from the buffer 115. Therefore, the latency for prefetch data is substantially less when reading the prefetch data stored in the buffer 115 than when reading the same data if stored on the storage media 120.

Unfortunately, many software processes are not designed to direct the computer 105 to request the storage device 110 to prefetch data. As a result, the latencies for reads from the storage device 110 are typically significantly longer than if the storage device 110 prefetched data. The embodiment of the present invention supports the storage device 110 learning prefetch data for a target software process. In addition, the storage device 110 may be enabled to prefetch the learned data for the target software process.

Figure 2:
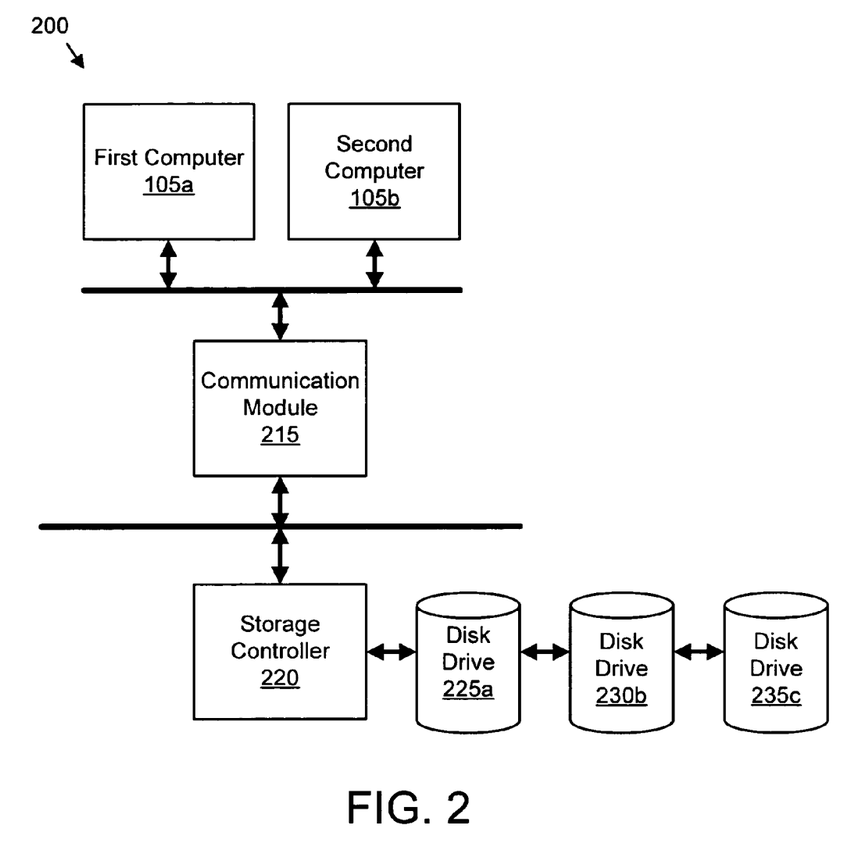
FIG. 2 is a schematic block diagram illustrating one alternate embodiment of a data processing system in accordance with the present invention.

FIG. 2 is a schematic block diagram illustrating one alternate embodiment of a data processing system 200 in accordance with the present invention. The system 200 includes one or more computers 105, a communication module 215, a storage controller 220, and one or more disk drives 225. Although for simplicity the system 200 is depicted with two computers 105, one communication module 215, one storage controller 220, and three disk drives 225, any number of computers 105, communication modules 215, storage controllers 220, and disk drives 225 may be employed.

The computer 105 may be the computer 105 of FIG. 1. The computer 105 may communicate with the communication module 215 through a network such as an Ethernet network, the Internet, a token ring network, or the like. The communication module 215 may be configured as a router, a server, or the like. The computer 105 may communicate through the communication module 215 to the storage controller 220.

The storage controller 220 may be a storage device 110 such as the storage device 110 of FIG. 1. The storage controller 220 may be configured as a data processing device and execute one or more software processes. The disk drives 225 may be configured as hard disk drives. The disk drives 225 may be the storage media 120 of FIG. 1. The storage controller 220 may communicate with the disk drives 225 through one or more communication channels such as a SCSI channel, a Fibre Channel, or the like.

The storage controller 220 may receive requests from the computer 105 to read data from and write data to the disk drives. In addition, the storage controller 220 may store data that is to be written to the disk drives 225 or data that is read from the disk drives 225 in a buffer 115 such as the buffer 115 of FIG. 1.

Figure 3:
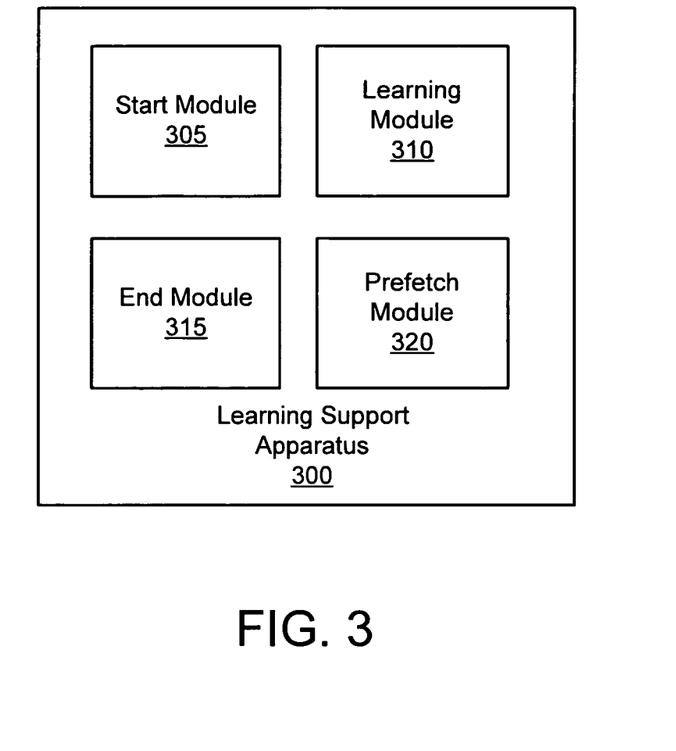
FIG. 3 is a schematic block diagram illustrating one embodiment of a learning support apparatus of the present invention.

FIG. 3 is a schematic block diagram illustrating one embodiment of a learning support apparatus 300 of the present invention. The apparatus 300 includes a start module 305, a learning module 310, an end module 315, and a prefetch module 320. In one embodiment, the start module 305 and the end module 315 are configured as software processes executing on a computer 105 such as the computers 105 of FIGS. 1 and 2. In addition, the learning module 310 and the prefetch module 320 may be configured as software processes executed by a storage device 110 such as the storage device 110 of FIG. 1 and the storage controller 220 of FIG. 2.

The start module 305 communicates a start of a target software process to a storage device 110. In one embodiment, the start module may be configured as an API. The start module 305 API may be executed as a function call to an operating system as is well known to those skilled in the art. The start module 305 may communicate a command to the storage device 110 that indicates the start of the target software process. For example, the start module 305 may communicate a SCSI command to the storage device 110. Alternatively, the start module 305 may communicate a FCP command to the storage device 110.

The start module 305 may communicate a target software process identifier such as the name of the target software process to the storage device 110 with the command. For example, the start module 305 may communicate the identifier 'orderentry' for an order entry target software process. In an alternate embodiment, the start module 305 communicates a reference number identifying the target software process. In addition, the start module 305 may communicate one or more data words configured to indicate to the storage device that the target software process is starting. For example, the start module 205 may communicate the hexadecimal data word 'FFFFFFCFx' to indicate a storage device 110 command and the hexadecimal data word 'FFFFFFB9x' to indicate the start of a software process.

The learning module 310 learns data blocks accessed for the target software process. As used herein, data blocks refer to a unit that may be used by the computer 105 or storage device 110 to organize data. For example, the data block may be a fixed or variable number of data words stored contiguously on the storage device 110. The data block may also be a logical designation for a set of data word addresses.

In one embodiment, the learning module 305 maintains a prefetch list of each data block accessed by the target software process. In one embodiment, the prefetch list is configured as linked array wherein each array element references a unique data block. Each array element may further contain one or more data fields recording access frequency data. For example, each array element may include a previous count field recording the number of instances the data block was accessed during one or more previous executions of the target software process. In addition, each array element may include a current count field recording the number of instances the data block was accessed during a current execution of the target software process.

In one embodiment, each array element further comprises one or more sequence data fields. For example, a previous sequence data field may record the order in which data fields were read by the target software process during one or more previous executions of the target software process. Each array element may also include a current sequence field recording the order in which the data block is accessed during the current execution of the target software process.

The prefetch list may also include an array element that stores the target software process identifier. The prefetch list may further contain one or more data fields indicating the number of times the target software process has been previously executed. The learning module 310 may begin learning the data blocks upon receiving the communication from the start module 305.

The end module 310 communicates an end of the target software process to the storage device 110. In one embodiment, the end module 310 is also configured as an API executed as a function call to the operating system. The end module 310 may communicate a command such as a SCSI command or a FCP command to the storage device 110 indicating that the target software process is ending. The end module 315 may communicate the target software process identifier and one or more data fields configured to indicate that the target software process is ending with the command. In one embodiment, the learning module 310 terminates learning the data blocks accessed for the target software process upon receiving the communication from the end module 315.

In one embodiment, the prefetch module 320 prefetches the learned data blocks in response to the receiving the communication from the start module 305. In a certain embodiment, the prefetch module 320 prefetches data blocks identified from the prefetch list maintained by the learning module 310. In one embodiment, the prefetch module 320 prefetches one or more data blocks that were frequently used in previous executions of the target software process. The example, the prefetch module 320 may prefetch the data blocks with the highest previous count data field value.

In an alternate embodiment, the prefetch module 320 prefetches the data blocks that were accessed first in previous executions of the target software process. For example, the prefetch module 320 may prefetch the data blocks with the lowest previous sequence data field values. In a certain embodiment, the prefetch module 320 may employ both frequency and access sequence data in determining which data blocks to prefetch. The apparatus 300 allows the storage device 110 to determine which data blocks should be prefetched for the target software process. In addition, the apparatus 300 may prefetch the learned data blocks.

Figure 4:
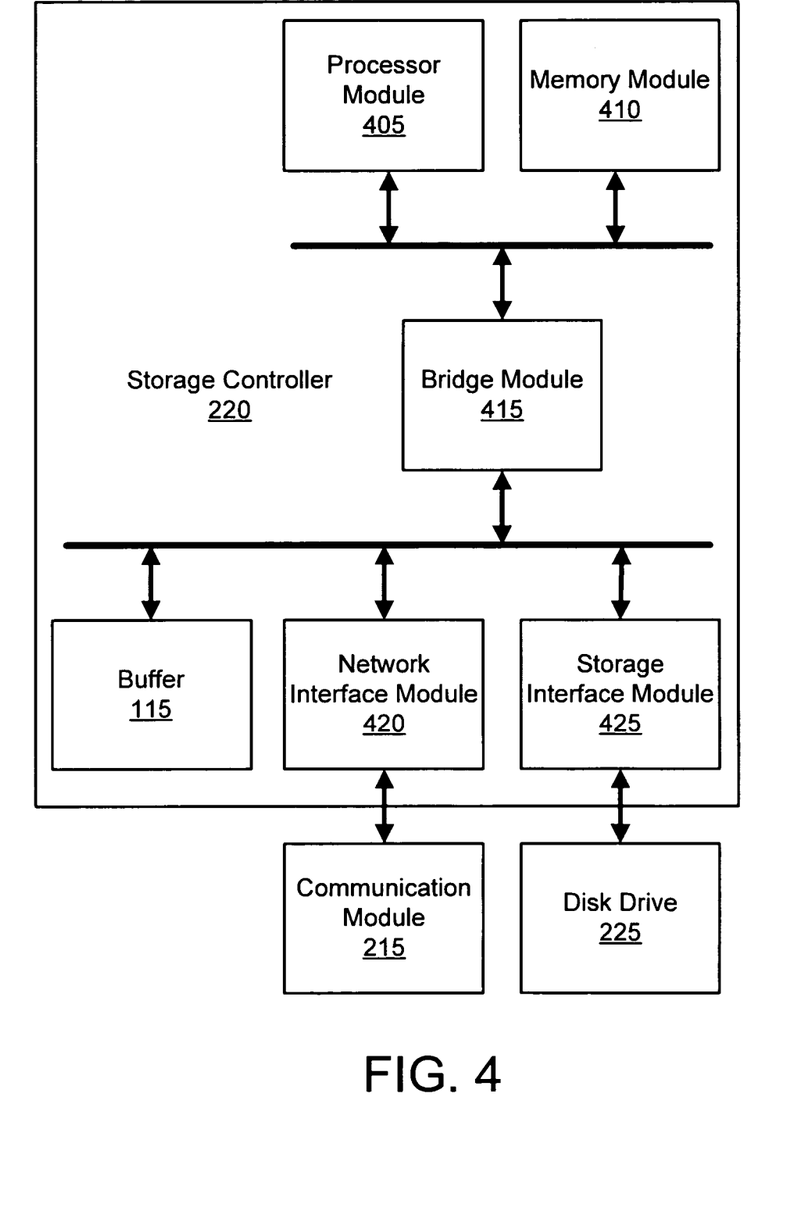
FIG. 4 is a schematic block diagram illustrating one embodiment of a storage controller of the present invention.

FIG. 4 is a schematic block diagram illustrating one embodiment of a storage controller 220 of the present invention. The controller 400 includes a processor module 405, a memory module 410, a bridge module 415, a buffer 115, a network interface module 420, and a storage interface module 425. In addition, the controller 400 is depicted in communication with a communication module 215 and disk drive 225 such as the communication module 215 and disk drive 225 of FIG. 2. The controller 400 may be the storage controller 220 of FIG. 2. The controller 400 may also be configured as the storage device 110 of FIG. 1. The buffer 115 may be the buffer 115 of FIG. 1. In addition, FIG. 4 refers to other elements of FIGS. 1-3.

The processor module 405, memory module 410, bridge module 415, buffer 115, network interface module 420, and storage interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the buffer 115, the host interface module 420, and the storage interface module 425 may be through semiconductor metal layers, substrate to substrate wiring, or circuit card traces or wires connecting the semiconductor devices.

The memory module 410 stores software instructions and data. The processor module 405 executes the software instructions and manipulates the data as is well know to those skilled in the art. In one embodiment, the memory module 410 stores and the processor module 405 executes the learning module 310 and prefetch module 320 of FIG. 3.

The controller 400 may receive a request to read data from the disk drive 225 through the communication module 215. The communication module 215 may have received the request from a computer 105. The network interface module 420 may communicate the request through the bridge module 415 to the processor module 405. The processor module 405 may calculate the location of the data on the disk drive 225 and communicate a read command through the bridge module 415 and the storage interface module 425 to the disk drive 225. The storage interface module 425 may be configured as a SCSI port or as a Fibre Channel port. The disk drive 225 transmits the read data to the storage interface module 425. The processor module 405 may direct the storage interface module 425 to write the data to the buffer 115. The processor module 405 may further direct the communication of the data from the buffer 115 through the network interface module 420 to the communication module 215, and the communication module 215 may communicate the data to the computer 105.

The network interface module 420 may receive a communication from a start module 305 through the communication module 215. The network interface module 420 may transmit the communication through the bridge module 415 to the processor module 405. The processor module 405 may execute the learning module 310, and create a prefetch list of data blocks accessed during subsequent reads directed to the disk drive 225. The processor module 405 may store the prefetch list in the memory module 410. Alternatively, the processor module 405 may store the prefetch list on the disk drive 225.

In one embodiment, the processor module 405 further executes the prefetch module 320 in response to the communication from the start module 305. The processor module 405 may employ the prefetch list to determine one or more data blocks to prefetch. In addition, the processor module 405 may read the prefetch data from the disk drive 225 to the buffer 115. If the processor module 405 receives a read request for the prefetch data, the processor module 405 may direct the buffer 115 to communicate the data from the buffer 115 through the network interface module 420 to the communications module 215.

Figure 5:
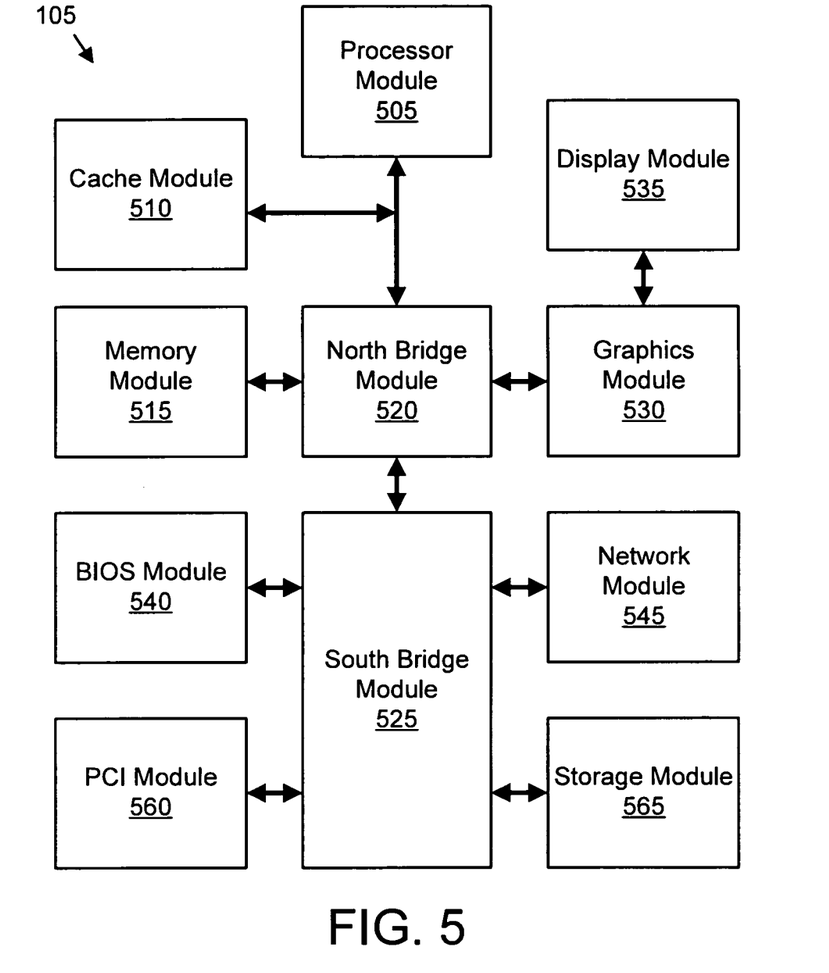
FIG. 5 is a schematic block diagram illustrating one embodiment of a computer of the present invention.

FIG. 5 is a schematic block diagram illustrating one embodiment of a computer 105 of the present invention. The computer 105 includes a processor module 505, a cache module 510, a memory module 515, a north bridge module 520, a south bridge module 525, a graphics module 530, a display module 535, a basic input/output system ("BIOS") module 540, a network module 545, a peripheral component interconnect ("PCI") module 560, and a storage module 565. The computer 105 may be the computer 105 of FIGS. 1 and 2. FIG. 5 may further reference elements of FIGS. 1-4.

The processor module 505, cache module 510, memory module 515, north bridge module 520, south bridge module 525, graphics module 530, display module 535, BIOS module 540, network module 545, PCI module 560, and storage module 565, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate to substrate wiring, or circuit card traces or wires connecting the semiconductor devices.

The memory module 515 stores software instructions and data. The processor module 505 executes the software instructions and manipulates the data as is well know to those skilled in the art. In one embodiment, the memory module 515 stores and the processor module 505 executes the start module 305 and the end module 315 of FIG. 3. The processor module 505 may communicate a start of a target software process and an end of the target software process through the north bridge module 520, the south bridge module 525, and the network module 545 to a communication module 215 such as the communication module 215 of FIG. 2.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
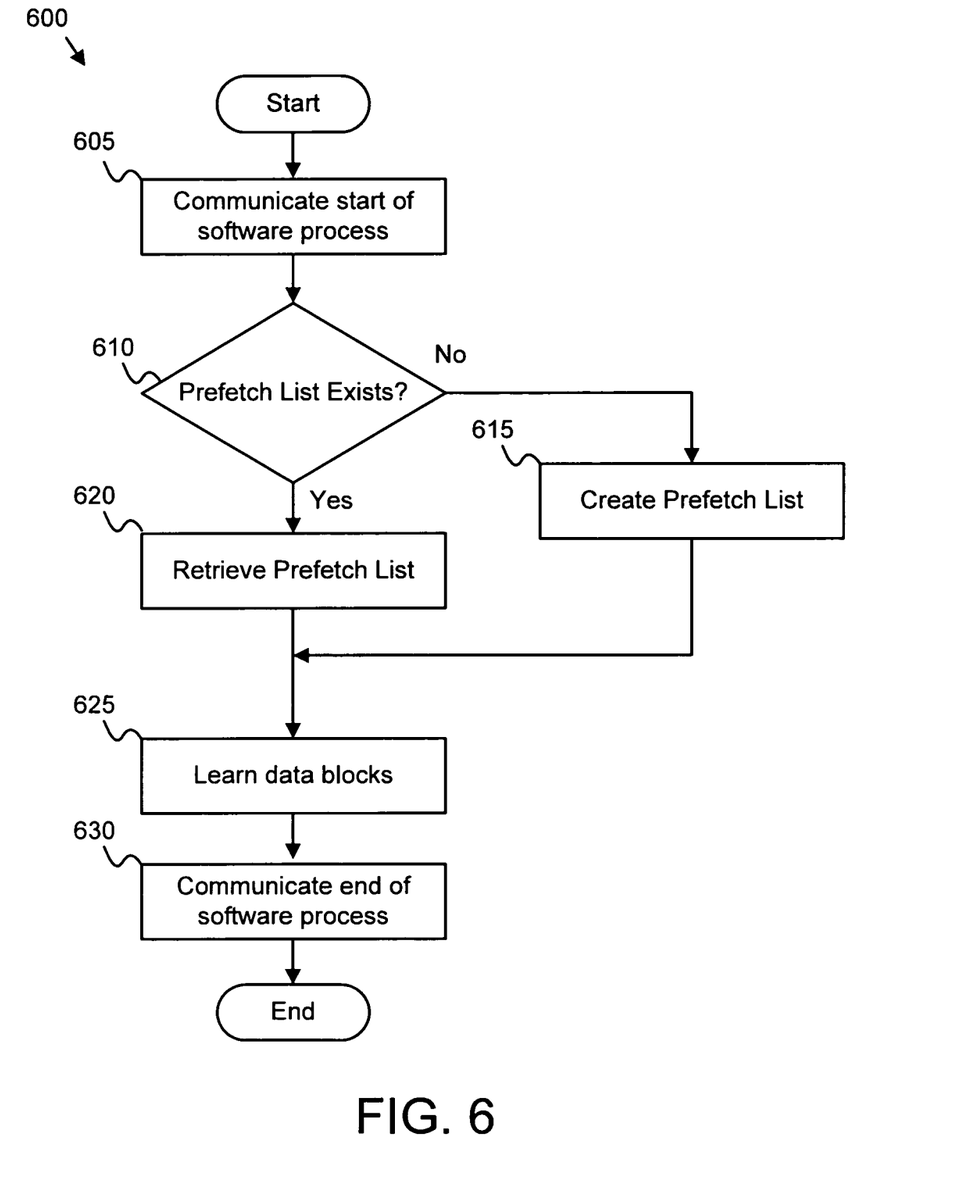
FIG. 6 is a schematic flow chart diagram illustrating one embodiment of a prefetch data determination method of the present invention.

FIG. 6 is a schematic flow chart diagram illustrating one embodiment of a prefetch data determination method 600 of the present invention. The method 600 substantially includes the steps necessary to carry out the functions presented above with respect to the operation of the described apparatus 300, 400, 500 and systems 100, 200 of FIGS. 1-5. In addition, the method 600 references the elements of FIGS. 1-5.

The method 600 begins and a start module 305 communicates 605 a start of a target software process to a storage device 110. The start module 305 may communicate 605 a command such as a SCSI or a FCP command to the storage device 110. In one embodiment, the start module 305 is configured as an API that is called by an operating system when a software process is spawned. In a certain embodiment, the operating system calls the start module 305 for each spawned software process if an operating system control parameter is asserted. For example, the operating system may call the start module 305 if a parameter such as NotifyStorageOfPrefetch is set to a value of one (1).

A learning module 310 determines 610 if a prefetch list exists for the target software process. In one embodiment, the learning module 310 is called by a storage device 110 in response to the storage device 110 receiving the start module 305 communication 605. Alternatively, the start module 305 communication 605 may include a call to the learning module 310.

In one embodiment, the learning module 310 parses a target software identifier from the start module 305 communication 605. The learning module 310 may search for a prefetch list corresponding to the target software identifier. For example, if the target software identifier is 'orderentry,' the learning module may search one or more prefetch lists for a prefetch list that includes the target software identifier 'orderentry.'

If the learning module 310 determines 610 the prefetch list for the target software process exists, the learning module 310 may retrieve 620 the prefetch list. If the learning module 310 determines 610 the prefetch list for the target software process does not exist, the learning module 310 may create 615 the prefetch list.

The learning module 310 learns 625 data blocks accessed by the target software process. In one embodiment, the learning module 310 records the data blocks accessed by the target software process in the prefetch list. The learning module 310 may also record the frequency and sequence of access for the data blocks.

An end module 315 communicates 630 an end of the target software process to the storage device 110 and the method 600 terminates. The end module 315 may communicate 630 a command such as a SCSI or FCP command to the storage device 110. In one embodiment, the end module 315 is configured as an API that is called by an operating system whenever a target software process for which the operating system called the start module 305 is terminated or a certain portion of the target software process completes. The method 600 determines prefetch data for the target software process.

FIG. 700 is a schematic flow chart diagram illustrating one alternate embodiment of a prefetch data determination method 700 of the present invention. The method 700 substantially includes the steps necessary to carry out the functions presented above with respect to the operation of the described method 600, apparatus 300, 400, 500, and systems 100, 200 of FIGS. 1-6. In addition, the method 700 references the elements of FIGS. 1-5.

Figure 7:
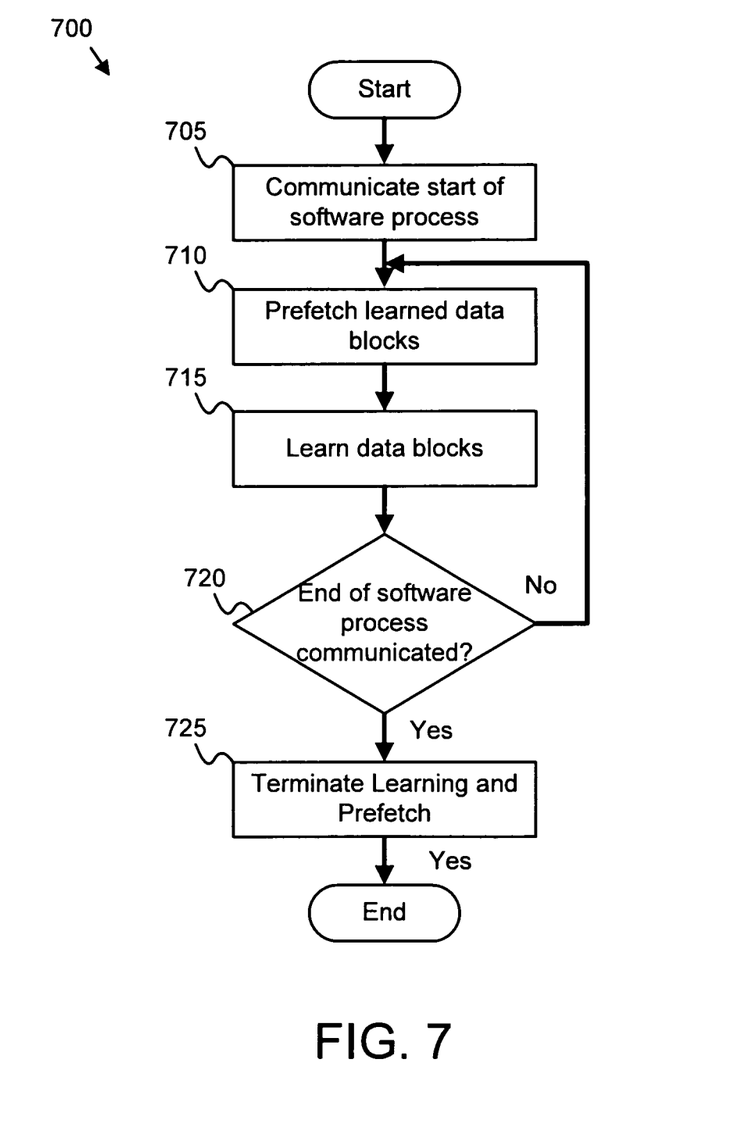
FIG. 7 is a schematic flow chart diagram illustrating one alternate embodiment of a prefetch data determination method of the present invention.

The method 700 begins and a start module 305 communicates 705 a start of a target software process to a storage device 110. In one embodiment, the start module 305 is configured as an API that is called by a software application. The storage device 110 may ignore the communication 705 if the storage device 110 does not support the method 700.

In one embodiment, a prefetch module 320 prefetches 710 learned data blocks for the target software process. The storage device 110 may call the prefetch module 320 in response to receiving the start module 305 communication 705. Alternatively, the start module 305 communication 705 may comprise a call to the prefetch module 320. The prefetch module 320 may parse the start module 305 communication for a target software process identifier and locate a prefetch list corresponding to the identifier. The prefetch module 320 may not prefetch data if no prefetch list corresponding to the identifier exists. In one embodiment, the prefetch module 305 prefetches data blocks in the sequential order of a previous access by the target software process as recorded by the prefetch list. In an alternate embodiment, the prefetch module 305 prefetches data blocks that were previously accessed most frequently by the target software process.

A learning module 310 learns 715 the data blocks accessed by the target software process. In one embodiment, the learning module 310 modifies the existing prefetch list for the target software process. In an alternate embodiment, the learning module 310 overwrites the previous learning data in the prefetch list.

In one embodiment, the learning module 310 and prefetch module 320 determine 720 if an end module 315 communicated an end of the target software process. If the learning module 310 and prefetch module 320 determine 720 the end module 315 did not communicate the end of the target software process, the prefetch module 320 continues prefetching 710 learned data blocks and the learning module 310 continues learning 715 the data blocks.

If the learning module 310 and prefetch module 320 determine 720 the end module 315 communicated the end of the target software process, the learning module 310 and prefetch module 320 terminate 725 learning the data blocks and prefetching the learned data blocks respectively and the method 700 terminates.

Figure 8:
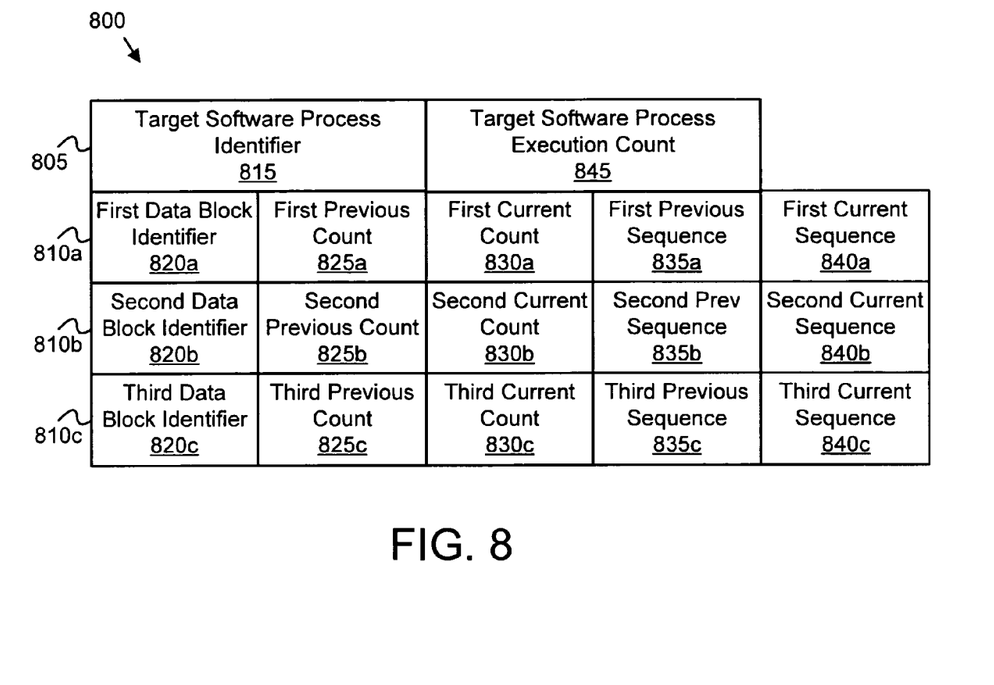
FIG. 8 is a schematic block diagram illustrating one embodiment of a prefetch list of the present invention.

FIG. 8 is a schematic block diagram illustrating one embodiment of a prefetch list 800 of the present invention. The prefetch list 800 may be created 615 by the learning module 310 of FIG. 3 and employed by the learning module 310 and the prefetch module 320 of FIG. 3.

In the depicted embodiment, the prefetch list 800 is configured as a linked array comprising a plurality of array elements 805, 810. In an alternate embodiment, the prefetch list 800 may be configured as a flat file. An identifier array element 805 may comprise a target software process identifier 815 and a target software process execution count 845. The target software process identifier 815 may uniquely identify a target software process. In one embodiment, the target software process identifier 815 is received from the start module 305. The target software process execution count 845 records the number of instances the target software process is executed. For example, if a start module 305 such as the start module 305 of FIG. 3 communicates a command indicating the start of the software process on three (3) instances, the learning module 310 may record the value three (3) in the target software process execution count 845.

The prefetch list 800 may comprise a plurality of data block elements 810. In one embodiment, each data block element 810 includes a data block identifier 820, a previous count data field 825, a current count data field 830, a previous sequence data field 835, and current sequence data field 840. In one embodiment, the learning module 310 creates a data block element 810 for each data block accessed by the target software process.

In one embodiment, the learning module 310 records the frequency a data block is accessed in the current count data field 830. For example, if a second data block corresponding to a second data block element 810b is accessed three times by the target software process, the learning module 310 may record the value three (3) in the current count data field 830. Upon receiving communication 605, 705 of the end of the target software process, the learning module 310 may modify the previous count data field 825 value using the current count data field 830 value. For example, the learning module 310 may record the sum of the current count data field 830 value and the previous count data field 825 value in the previous count data field 825.

The learning module 310 may initialize the previous count data field 825 to a specified value such as zero (0). In addition, the learning module 310 may store the cumulative count of the target software process accessing the data block in the previous count data field 825. For example, if the target software process accessed the second data block a total of thirty-three instances over three executions of the target software process, the learning module 310 may record thirty-three (33) in the second previous count data field 825b.

In one embodiment, the learning module 310 records the access sequence of the data blocks by the target software process. For example, if the target software process accessed the second data block first, the learning module 310 may record a value one (1) in the current sequence data field 840. Upon receiving communication 605, 705 of the end of the target software process, the learning module 310 may copy the current sequence data field 840 value to the previous sequence data field 835. In an alternate embodiment, the learning module 310 modifies the previous sequence data field 835 value using the current sequence data field 840 value.

In one embodiment, the prefetch module 320 employs the prefetch list 800 to determine prefetch data blocks. For example, if the second previous count data field 825b of the second data block element 810b contained the highest value of all the previous count data fields 825, the prefetch module 320 may prefetch the data block identified by the second data block identifier 820b. In an alternate example, if the second previous sequence data field 835b of the second data block element 810b contained the lowest value of all the previous sequence data fields 835, the prefetch module 320 may prefetch the data block identified by the second data block identifier 820b.

The embodiment of the present invention supports a storage device 110 learning prefetch data for a target software process. In addition, the embodiment of the present invention may prefetch the learned prefetch data for the target software process. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to determine prefetch data, the apparatus comprising:
a semiconductor device storing executable code executed by a processor, the executable code comprising:
a start module communicating a first start of a target software process to a storage device;
a learning module recording a target software process identifier and target software process count to a prefetch list for the target software process, recording a data block element for each data block of the target software process, and recording a first cumulative count of executions of each data block as a current count and a first sequence value associated with the current count and indicating an order of execution of accesses to each data block of the target software process as a current sequence in each data block element for the first start of the target software process;
an end module communicating an end of the target software process to the storage device;
the start module communicating a second start of the target software process to the storage device;
the learning module recording a sum of the first cumulative count and a previous count of each data block element as the previous count in the data block element and a second cumulative count of accesses of each data block for the second start of the target software process as the current count in the data block element and recording the first sequence value of each data block as a previous sequence value associated with the previous count in the data block element and a second sequence value for the second start of the target software process as the current sequence in the data block element; and
a prefetch module prefetching a first data block with a high data block element previous count value and a low data block element previous sequence value.

2. The apparatus of claim 1, wherein an operating system initiates the start module and the end module.

3. The apparatus of claim 1, wherein a software application initiates the start module and the end module.

4. A system to determine prefetch data, the system comprising:
a computer comprising
a start module communicating a first start of a target software process and a second start of the target software process to a storage device; and
an end module communicating an end of the target software process to the storage device;
the storage device storing data and comprising a learning module, the learning module recording a target software process identifier and target software process count to a prefetch list for the target software process, recording a data block element for each data block of the target software process, and recording a first cumulative count of executions of each data block as a current count and a first sequence value associated with the current count and indicating an order of execution of accesses to each data block of the target software process as a current sequence in each data block element for the first start of the target software process;
the learning module recording a sum of the first cumulative count and a previous count of each data block element as the previous count in the data block element and a second cumulative count of accesses of each data block for the second start of the target software process as the current count in the data block element and recording the first sequence value of each data block as a previous sequence value associated with the previous count in the data block element and a second sequence value for the second start of the target software process as the current sequence in the data block element; and
a prefetch module prefetching a first data block with a high data block element previous count value and a low data block element previous sequence value.

5. The system of claim 4, the storage device further comprising a buffer configured to store prefetch data.

6. The system of claim 5, wherein the storage device is configured as a storage controller.

7. The system of claim 6, further comprising a disk drive in communication with the storage controller.

8. A semiconductor device storing executable code executed by a processor to perform an operation to determine prefetch data, the executable code comprising:
a start module communicating a first start of a target software process to a storage device;
a learning module learning data blocks accessed by the target software process by recording a target software process identifier and target software process count to a prefetch list for the target software process, recording a data block element for each data block of the target software process, and recording a first cumulative count of executions of each data block as a current count and a first sequence value associated with the current count and indicating an order of execution of accesses to each data block of the target software process as a current sequence in each data block element for the first start of the target software process;
a stop module communicating an end of the target software process to the storage device;
the start module communicating a second start of the target software process to the storage device;
the learning module recording a sum of the first cumulative count and a previous count of each data block element as the previous count in the data block element and a second cumulative count of accesses of each data block for the second start of the target software process as the current count in the data block element and recording the first sequence value of each data block as a previous sequence value associated with the previous count in the data block element and a second sequence value for the second start of the target software process as the current sequence in the data block element; and
a prefetch module prefetching a first data block with a high data block element previous count value and a low data block element previous sequence value.

9. The semiconductor device of claim 8, wherein the start module configured as an application program interface communicates the start of the target software process and the end module configured as an application program interface communicates the end of the target software process, the application program interfaces comprising executable code stored on the semiconductor device and executed by the processor.

10. The semiconductor device of claim 9, wherein an operating system initiates the start and end modules.

11. The semiconductor device of claim 9, wherein a software application initiates the start and end modules.

12. A method for deploying computer infrastructure, comprising integrating computer-readable code into a semiconductor device of a computing system, wherein the code is executed by a processor in combination with the computing system to perform the following:

communicating a first start of a target software process to a storage device;

learning data blocks accessed by the target software process by recording a target software process identifier and target software process count to a prefetch list for the target software process, recording a data block element for each data block of the target software process, and recording a first cumulative count of executions of each data block as a current count and a first sequence value associated with the current count and indicating order of execution of accesses to each data block of the target software process as a current sequence in each data block element for the first start of the target software process;

communicating an end of the target software process to the storage device;

communicating a second start of the target software process to the storage device;

recording a sum of the first cumulative count and a previous count of each data block element as the previous count in the data block element and a second cumulative count of accesses of each data block for the second start of the target software process as the current count in the data block element and recording the first sequence value of each data block as a previous sequence value associated with the previous count in the data block element and a second sequence value for the second start of the target software process as the current sequence in the data block element; and prefetching a first data block with a high data block element previous count value and a low data block element previous sequence value.

* * * * *